United States Patent Office 3,446,841
Patented May 27, 1969

3,446,841
ISOLATION OF 5-HYDROXY-7-
CHLORTETRACYCLINE
Lester Allen Mitscher, Pearl River, and John Henry Edward James Martin, New City, N.Y., assignors to American Cyanamid Company, Stamford, Conn., a corporation of Maine
No Drawing. Filed Apr. 22, 1966, Ser. No. 544,359
Int. Cl. C07c 103/19
U.S. Cl. 260—559                     5 Claims

ABSTRACT OF THE DISCLOSURE

This disclosure describes a process for purifying 7-chloro-5-hydroxytetracycline by means of partition chromatography wherein the partition column developed a pH gradient.

---

This invention relates to the purification of 7-chloro-5-hydroxytetracycline and, more particularly, is concerned with a novel partition chromatographic process for the purification of impure 7-chloro-5-hydroxytetracycline.

In partition chromatography, one liquid phase (the stationary phase) is held immobile on an inert support while allowing a second liquid phase (the mobile phase), immiscible with the first liquid phase, to flow over it in such a way that the two phases are in contact over a very large interface. The inert support is a finely divided solid, conveniently in the form of a vertical column, on which the stationary phase is adsorbed with such tenacity that it will not migrate, while the solutes are not retained by adsorption. The solutes participate in a partition between the stationary phase, where they are held in a fixed position, and the mobile phase, where they migrate. Hence, the name "partition chromatography" as distinguished from adsorption chromatography.

The inert supports which may be employed in the novel process of the present invention must be non-alkaline. Suitable inert supports for this purpose may be, for example, cellulose, starch, Sephadex®, Celite®, etc., or mixtures thereof. The stationary phase which is adsorbed and held immobile on the inert support is an aqueous pH 7.0 buffered solution. Any buffer system which will provide a pH of about 7.0 to the aqueous stationary phase may be employed. Conveniently, the inert support is wetted with the aqueous pH 7.0 buffered solution and the resulting moist mixture is then packed in to a vertical column which may be of any convenient size and of any suitable material although glass columns of about 1 inch in diameter and about 2–3 feet in length are preferred.

The impure 7-chloro-5-hydroxytetracycline is dissolved in the stationary phase in the following manner. The impure 7-chloro-5-hydroxytetracycline, preferably in the form its its mineral acid salt, is dissolved in a minimum amount of water and the pH of this concentrated solution is adjusted to about 2–3. An aqueous concentrate of 7-chloro-5-hydroxytetracycline in the form of its mineral acid salt may be employed directly after the pH of the concentrate has been adjusted to about 2–3. Any mineral acid salt of the 7-chloro-5-hydroxytetracycline may be employed, for example, the hydrochloride, sulfate, phosphate, hydrobromide, etc. The concentrated aqueous solution (pH 2–3) of the 7-chloro-5-hydroxytetracycline mineral acid salt is then mixed with sufficient column packing to form a paste-like mass and this homogenized charge is then packed on top of the prepacked column of inert support and stationary phase. The mobile phase is then placed on top of the homogenized charge. The mobile phase is permitted to flow down through the column either by gravity or by applying pressure above the reservoir of mobile phase on top of the column.

A novel characteristic of the resulting partition column is that it is arranged so as to develop a pH gradient as the acidic charge passes over the neutral support. Since 7-choloro-5-hydroxytetracycline is unstable at a neutral pH and is not resolved from its impurities at an acid pH, the present process provides a practical compromise between instability and resolution. Thus, 7-chloro-5-hydroxytetracycline is placed on the column at a stable pH (2–3), is carried down the column by the mobile phase where it meets a progressively higher pH and is resolved from its impurities, and is immediately readjusted to a stable pH upon emergence from the column.

The mobile phase is an organic solvent such as ethyl acetate, n-butanol, dioxane, tetrahydrofuran, chloroform, benzene, carbon tetrachloride, etc. or mixtures thereof. It is essential, however, that the mobile phase be immiscible with water in the proportions used. Prior to use, the mobile phase is saturated with the stationary phase. The partition column process of the present invention is performed at reduced temperatures, preferably from 0° C. to 25° C., although best results are obtained at from 0° C. to about 5° C.

As the mobile phase issues from the bottom of the prepacked column, purified 7-chloro-5-hydroxytetracycline is found to come off the column first and the impurities come off the column last. The mobile phase containing the purified 7-chloro-5-hydroxytetracycline is immediately collected in cold aqueous mineral acid (hydrochloric, sulfuric, phosphoric, hydrobromic, etc.) of a pH of about 2.1 to about 2.5. The mixture of aqueous acid and mobile phase is then concentrated under reduced temperature and pressure to remove the mobile phase from the resultant aqueous acid solution of purified 7-chloro-5-hydroxytetracycline. Pure 7-chloro-5-hydroxytetracycline is then recovered from this aqueous acid solution by crystallization, lyophilization, etc. whereby crystalline 7-chloro-5-hydroxytetracycline in the form of its mineral acid salt is obtained.

The invention will be described in greater detail in conjunction with the following specific examples.

EXAMPLE 1

Preparation of cell suspension

S. rimosus ATCC 13,224 was grown on the following nutrient medium:

|  | Percent |
|---|---|
| Potassium chloride | 0.128 |
| Phosphoric acid (85%) | 0.024 |
| Ammonium chloride | 0.150 |
| Cornstarch | 5.5 |
| Magnesium chloride·6H$_2$O | 0.2 |
| Ammonium sulfate | 0.8 |
| Ferrous sulfate·7H$_2$O | 0.006 |
| Manganese sulfate·4H$_2$O | 0.005 |
| Cobalt chloride·6H$_2$O | 0.0005 |
| L-histidine | 0.08 |
| Calcium carbonate [1] | 1.0 |
| Zinc sulfate·7H$_2$O | 0.01 |
| Water, qs. to | 100.0 |

[1] Sterilized separately.

After a soluble growth period of 3–4 days the cells were filtered and washed successively with water and pH 6.5 buffer solution. The washed cells were resuspended in a portion of pH 6.5 buffer which was ¼ of the original mash volume. The substrate, 5a,11a-dehydrochlortetracycline was added to the buffered cell suspension to make a substrate concentration of 500 milligrams per liter of cell suspension. The mixture was stirred for 8 hours at 25°–28° C. and adjusted to pH 2.0 with hydrochloric acid.

EXAMPLE 2

Preparation of concentrate using acid-butanol process

The acidified cell suspension from Example 1 (7.6 liters) was mixed with 3% diatomaceous earth and then filtered. The filter pad was slurried in 9 liters of 0.01 N hydrochloric acid and filtered. The combined filtrates (16.5 liters) were extracted with two one-half volume portions of n-butanol. The pooled butanol extracts (18 liters) were concentrated in the presence of water to an aqueous phase (2.25 liters) at pH 1.8–2.4. The aqueous concentrate was adjusted to pH 3.0 with 5 N sodium hydroxide solution and lyophilized. The product may be purified using the process described in Example 6.

EXAMPLE 3

Preparation of a concentrate using a Tergitol® process

A 140 milliliter portion of acidified cell suspension (prepared as described in Example 1) was filtered with 1% diatomaceous earth and mixed with 500 micrograms of Tergitol® (sodium tetradecyl sulfate). This mixture was extracted twice with 100 milliliter portions of ethyl acetate. The ethyl acetate layers were back-extracted at pH 6.0 into water. The aqueous phase may be adjusted to pH 3.5 and evaporated at room temperature. The product may be purified using the process described in Example 6.

EXAMPLE 4

Preparation of concentrate using an Arquad® process

A 140 milliliter portion of the acidified cell suspension (prepared as described in Example 1) was filtered with 1% diatomaceous earth and treated with 2.8 grams of oxalic acid and 400 mcg. of Arquad® 16 (alkyltrimethylammonium chlorides). The pH was adjusted to 9.0 with ammonium hydroxide. The suspension was stirred with diatomaceous earth and 100 milliters of methylisobutyl ketone for 15 minutes. The suspension was filtered and the methylisobutyl ketone layer was shaken with 15 milliliters of 0.1 N hydrochloric acid and centrifuged. The aqueous phase may be adjusted to pH 3–3.5 and lyophilized. The product may then be purified as described in Example 6.

EXAMPLE 5

Preparation of a concentrate using a calcium ion process

A 220 milliliter portion of concentrate was prepared as described in Example 2, without, however, being lyophilized. A 7 gram portion of calcium chloride was added and the pH of the solution was adjusted to pH 8.5 with 5 N sodium hydroxide solution. The precipitate was removed by centrifugation and washed with water. The supernatant and washings were combined to give a yellow solution which was adjusted to pH 2.5. The precipitate was slurried in water, adjusted to pH 2.0 with hydrochloric acid and then extracted twice with half-volumes of n-butanol. The pooled n-butanol extracts were concentrated with water under reduced pressure to give an acidic aqueous phase which was adjusted to pH 2.5 and purified by partition chromatography as described in Example 6.

EXAMPLE 6

Purification of concentrates using partition chromatography

A 15 gram portion of lyophilized product (prepared as described in Example 2) was purified by partition chromatography on cellulose powder using an ethyl acetate:n-butanol:water system (7:3:10). All materials were chilled to 4° C. before use and the column separation was carried out at 4° C. The 400 grams of cellulose powder was moistened with 0.8 milliliter per gram (320 ml.) of phosphate buffer at pH 7.0 and chilled at 4° C. overnight. The lyophilized solid was mixed with 30 grams of cellulose powder and 24 milliliters of water and was adjusted to pH 2.2. The chilled charge was added to the top of the column and the column developed at 4° C. under pressure using the mobile phase. The product was located in the eluate by ultraviolet spectroscopy at 370 mμ. All fractions were adjusted to pH 2.1–2.5 with 1 N hydrochloric acid and water immediately upon emergence from the column. The active fractions were combined and then concentrated to an aqueous phase under reduced pressure. In favorable cases crystals appeared at this point. This material gave crystalline 5-hydroxy-7-chlorotetracycline from acidic methanol or water or mixtures of both.

What is claimed is:

1. In the process of purifying 7-chloro-5-hydroxytetracycline, the steps which comprise mixing an aqueous solution of a mineral acid salt of 7-chloro-5-hydroxytetracycline at a pH of 2–3 with sufficient column packing consisting of a pH 7.0 buffered aqueous stationary phase held immobile on an inert support, at a reduced temperature, to form a homogenized paste-like mass; placing the paste-like mass on top of a column packed with a pH 7.0 buffered aqueous stationary phase held immobile on an inert support at a reduced temperature; passing a mobile phase immiscible with the stationary phase down through the column at a reduced temperature; collecting the mobile phase containing 7-chloro-5-hydroxytetracycline and recovering 7-chloro-5-hydroxytetracycline therefrom.

2. A process according to claim 1 wherein the mineral acid salt of 7-chloro-5-hydroxytetracycline is 7-chloro-5-hydroxytetracycline hydrochloride.

3. A process according to claim 1 wherein the inert support is cellulose powder.

4. A process according to claim 1 wherein the mobile phase is a soluble of 7 parts ethyl acetate and 3 parts n-butanol.

5. A process according to claim 1 wherein the reduced temperature is about 4° C.

References Cited

UNITED STATES PATENTS

| | | |
|---|---|---|
| 2,878,289 | 3/1959 | McCormick et al. |
| 2,984,686 | 5/1961 | Blackwood et al. |
| 3,226,441 | 12/1965 | Miller. |
| 3,360,559 | 12/1967 | McCormick et al. |

NICHOLAS S. RIZZO, *Primary Examiner.*

ANNE MARIE TIGHE, *Assistant Examiner.*